United States Patent [19]

Fujimoto

[11] 4,390,001

[45] Jun. 28, 1983

[54] EXHAUST GAS RECIRCULATION SYSTEM FOR INTERNAL COMBUSTION ENGINES

[75] Inventor: Misao Fujimoto, Hiroshima, Japan

[73] Assignee: Toyo Kogyo Co., Ltd., Hiroshima, Japan

[21] Appl. No.: 312,747

[22] Filed: Oct. 19, 1981

[30] Foreign Application Priority Data

Oct. 20, 1980 [JP] Japan .................................. 55-147272

[51] Int. Cl.³ ............................................ F02M 25/06
[52] U.S. Cl. ..................................................... 123/571
[58] Field of Search .......................................... 123/571

[56] References Cited

U.S. PATENT DOCUMENTS

| 4,057,992 | 2/1978 | Linder et al. | 123/571 |
|---|---|---|---|
| 4,094,287 | 6/1978 | Nohira | 123/571 |
| 4,142,495 | 3/1979 | Lahiff | 123/571 |
| 4,164,206 | 8/1979 | Tuelle | 123/571 |
| 4,177,777 | 12/1979 | Maruyama et al. | 123/571 |
| 4,257,381 | 3/1981 | Yuzawa et al. | 123/571 |
| 4,274,385 | 6/1981 | Yuzawa et al. | 123/571 |
| 4,280,471 | 7/1981 | Masaki | 123/571 |
| 4,290,404 | 9/1981 | Hata et al. | 123/571 |
| 4,318,385 | 3/1982 | Yamaguchi | 123/571 |
| 4,347,570 | 8/1982 | Akiyama et al. | 123/571 |

FOREIGN PATENT DOCUMENTS 48-113931 3/1973 Japan .

Primary Examiner—Wendell E. Burns
Attorney, Agent, or Firm—Fleit, Jacobson & Cohn

[57] ABSTRACT

An engine exhaust gas recirculation system including a recirculation gas control valve provided in a gas recirculation passage. The gas recirculation passage is further provided with a restriction and pressure sensors for detecting the pressure drop across the restriction so that the opening of the control valve be adjusted in accordance with the engine operating conditions and with a prestored memories of optimum values of the pressure drop. The restriction is variable so that the effective opening thereof is increased as the recirculated gas flow increases.

6 Claims, 4 Drawing Figures

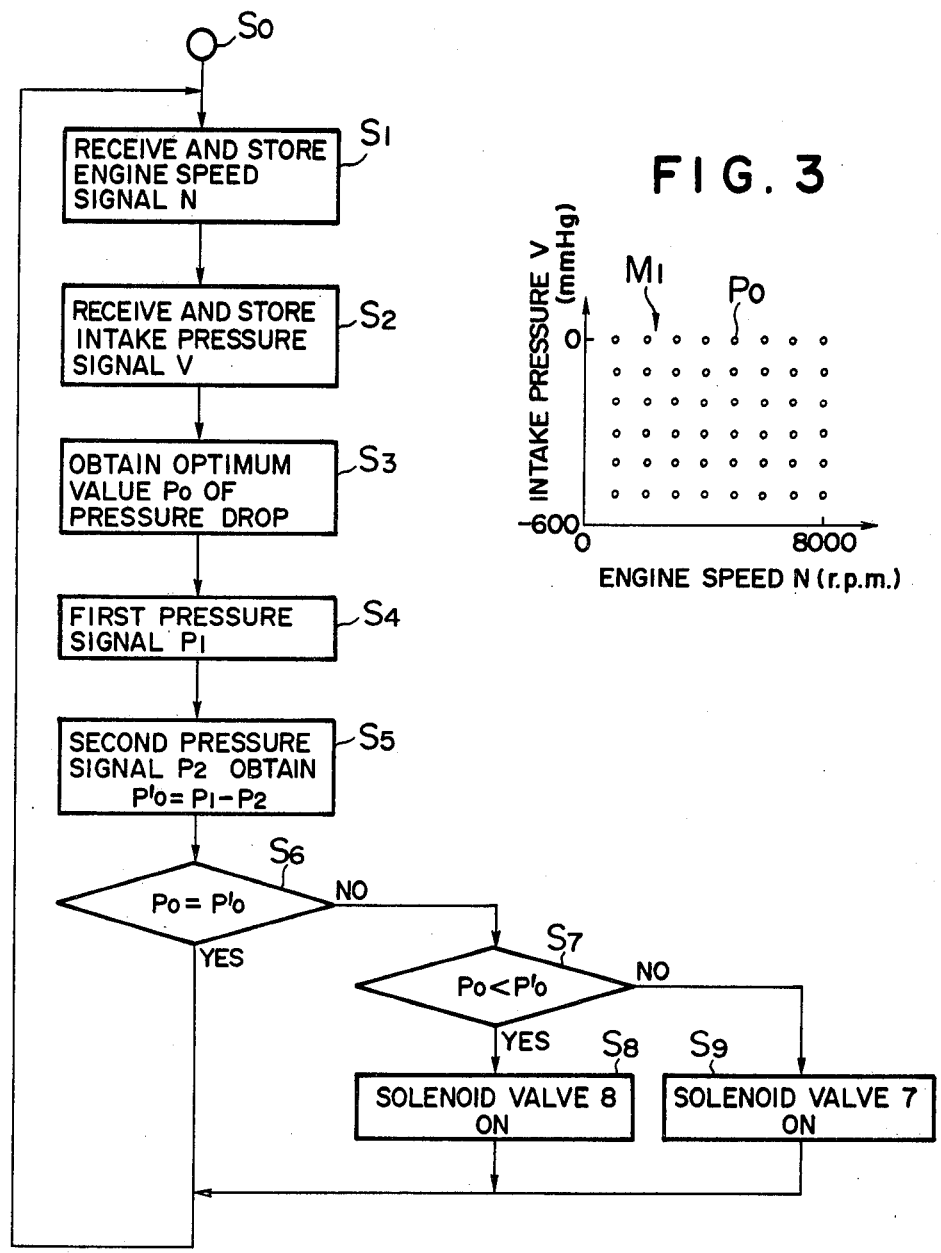
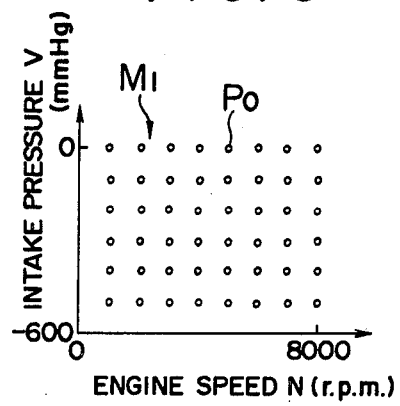

EXHAUST GAS RECIRCULATION SYSTEM FOR INTERNAL COMBUSTION ENGINES

The present invention relates to an exhaust gas recirculation system for internal combustion engines and more particularly to means for controlling the amount of exhaust gas recirculated to the engine intake system.

In order to suppress the amount of nitrogen oxides in the engine exhaust gas, an exhaust gas recirculation system has been commonly adopted. Such system generally includes a recirculation passage leading from the engine exhaust system to the intake system and a control valve provided in the passage for controlling the amount of recirculated gas in accordance with the conditions of engine operation. Japanese patent application No. 48-27104 which has been filed on Mar. 9, 1973 and disclosed for public inspection on Oct. 30, 1974 under the disclosure number of 49-113931 proposes a control arrangement for such exhaust gas recirculation system.

According to the proposal, the exhaust gas recirculation passage is provided with a restriction to produce a pressure drop which is a function of the flow through the restriction. The pressure drop across the restriction is compared with the venturi pressure of the carburetor or the exhaust gas pressure to accomplish a better adjustment of the control valve. In actual practice, optimum values of the pressure drop across the restriction may be experimentarily obtained under various engine operating conditions and stored in a memory device whereby the actual value of the pressure drop be compared with one of the memorized values in accordance with the engine operating conditions to thereby obtain a signal for adjusting the control valve. The proposed system is considered advantageous in that an appropriate control of the recirculation gas can be accomplished.

It should however be noted that in order to obtain an accurate control of the recirculation gas the cross-section of the restriction should be as small as possible. However, if the restriction is too small, the flow resistance in the recirculation passage increases so that a sufficient amount of recirculation cannot be provided under some operating conditions. If the restriction is sufficiently large to ensure a desired maximum amount of recirculation gas, the accuracy of the recirculation gas flow control will be decreased when the recirculation gas flow is small because under such conditions the pressure drop across the restriction is very small.

It is therefore an object of the present invention to provide an exhaust gas recirculation system in which the recirculated gas flow can be accurately controlled throughout the engine operating range.

Another object of the present invention is to provide a recirculated gas flow control device for an exhaust gas recirculation system which can provide an accurate control under a low flow range while permitting a sufficient peak flow under a high flow range.

According to the present invention, the above and other objects can be accomplished by an internal combustion engine comprising combustion chamber means, intake passage means leading to said combustion chamber means for providing a supply of intake gas, exhaust passage means leading from said combustion chamber means for exhausting combustion gas therefrom, an exhaust gas recirculation system including exhaust gas recirculation passage means leading from said exhaust passage means to said intake passage means, recirculating gas control valve means provided in said recirculation passage means for controlling recirculated gas flow through said recirculation passage means, means for detecting engine operating conditions and providing an engine operating condition signal, restriction means provided in said recirculation passage means, pressure drop sensing means for detecting a pressure drop across the restriction means, memory means having memories of optimum values of pressure drop under various engine operating conditions, control means for adjusting said control valve means so that the pressure drop detected by the sensing means conforms to the memorized optimum value under a specific engine operating condition, said restriction means comprising restriction valve means of which opening can be varied, means for controlling said restriction valve means so that the opening is increased as the recirculated gas flow is increased. The engine operating conditions detecting means may be a combination of an engine speed detector and an engine load sensor. The engine load may be detected in terms of an engine intake pressure or a throttle valve position. The control valve means and the restriction valve means may be of a pneumatically operated diaphragm type and connected with a common pressure source so that they are actuated synchronously.

The above and other objects and features of the present invention will become apparent from the following descriptions of preferred embodiments taking reference to the accompanying drawings, in which:

FIG. 2 is a chart showing an example of control of the exhaust gas recirculation;

FIG. 3 shows diagrammatically a map memorized in the memory device; and,

Figure 1:
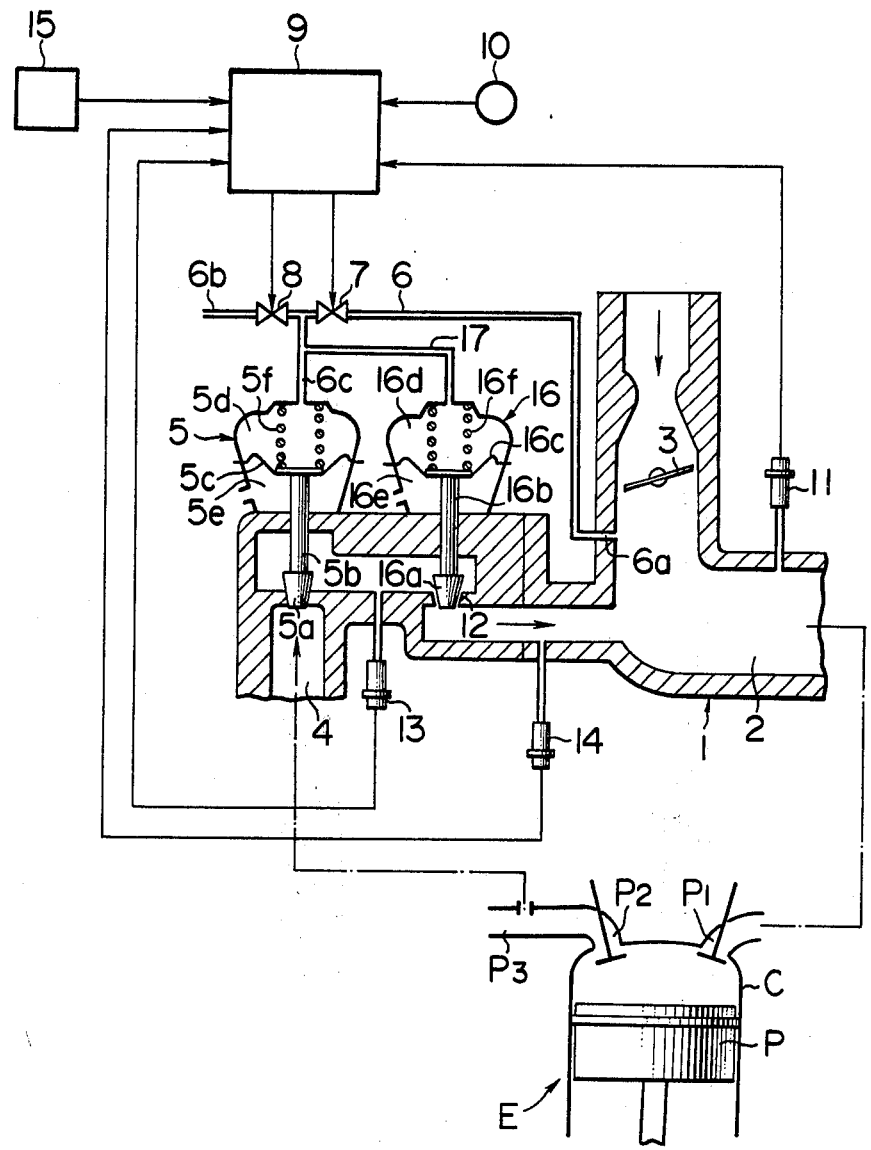
FIG. 1 is a sectional view of an exhaust gas recirculation system in accordance with one embodiment of the present invention.

Referring now to the drawings, particularly to FIG. 1, there is diagrammatically shown an engine E having a cylinder C and a piston P disposed in the cylinder C for reciprocating movement therein. The cylinder C is formed with an intake port $P_1$ and an exhaust port $P_2$. The intake port $P_1$ is connected with an intake passage 2 constituting an intake system 1. The exhaust port $P_2$ leads to an exhaust passage $P_3$. In the intake passage 2, there is provided a throttle valve 3 as well known in the art.

The engine has an exhaust gas recirculation system including a gas recirculation passage 4 having one end opened to the exhaust passage $P_3$ and the other end opened to the intake passage 2 downstream of the throttle valve 3. In the recirculation passage 4, there is provided a recirculation control valve 5 which comprises a valve member 5a and a valve stem 5b integrally connected at one end with the valve member 5a and secured at the other end with a diaphragm 5c. The diaphragm 5c defines a suction pressure chamber 5d and an atmospheric pressure chamber 5e at the opposite sides thereof and a spring 5f is provided in the suction pressure chamber 5d for urging the valve member 5a toward the closed position. When a suction pressure is introduced into the chamber 5d, the diaphragm 5c is deflected against the action of the spring 5f to move the valve member 5a toward an open position. The opening of the control valve 5 is determined by the suction pressure introduced into the chamber 5d.

The suction pressure chamber 5d of the control valve 5 is connected through a branch passage 6c with a suction pressure passage 6 which is at one end 6a opened to the intake passage 2 downstream of the throttle valve 3 and at the other end 6b to the atmosphere. A pair of solenoid valves 7 and 8 are provided in the passage 6 and the branch passage 6c is connected with the passage 6 between the valves 7 and 8. A control device 9 is provided for appropriately controlling the solenoid valves 7 and 8 to thereby establish a desired value of suction pressure in the branch passage 6c. The control device 9 receives control signals from an engine speed detector 10 and an intake pressure senser 11.

The exhaust gas recirculation passage 4 is formed downstream of the control valve 5 with a restriction 12 and a first and second pressure sensers 13 and 14 are provided in the passage 4 respectively upstream and downstream of the restriction 12. The pressure sensers 13 and 14 produce signals which are applied to the control device 9. The restriction 12 is associated with a restriction valve 16 which has a valve member 16a adapted to cooperate with the restriction 12. The valve member 16a is integral with a valve stem 16b which is connected with a diaphragm 16c. The diaphragm 16c defines a suction pressure chamber 16d and an atmospheric pressure chamber 16e at the opposite sides thereof. A spring 16f is provided in the suction pressure chamber 16d so as to urge the diaphragm 16c and the valve member 16a toward the closed position. When a suction pressure is introduced into the chamber 16d, the diaphragm 16d and therefore the valve member 16a are moved toward an open position. The suction pressure chamber 16d in the restriction valve 16 is connected through a passage 17 with the branch passage 6c so that the valve 16 is actuated by the same source as and in synchronism with the valve 15.

In order to control the recirculated gas flow to an optimum value, there is provided a memory device 15. The memory device 15 stores memories of optimum values of the pressure drop across the restriction 12 under various engine operating conditions, the optimum values having been determined through experiments with various combinations of the engine speed and the intake suction pressure controlling the position of the valve member 16a synchronously with the valve member 5a as described above. FIG. 3 shows an example of the memory map $M_1$ storing such optimum values $P_o$ of the pressure difference.

The control device 9 receives from the memory device 15 a signal corresponding to the optimum value $P_o$ of the pressure drop across the restriction 12 in each instance of engine operation and applies its outputs to the solenoid valves 7 and 8 to appropriately energize the same so that the actual pressure drop $P_o'$ conforms to the optimum value $P_o$. Thus, the recirculation control valve 5 is controlled to an optimum position so that an optimum recirculation gas flow is established. Stating more precisely, the control device 9 receives the engine speed signal from the speed senser 10 and the intake suction pressure from the intake pressure senser 11. Based on these signals, the control device 9 addresses a stored memory in the map $M_1$ to obtain an optimum value P of the pressure drop under such engine operating condition.

The control device 9 further receives pressure signals from the pressure sensers 13 and 14 and calculates the actual pressure drop $P_o'$ which is compared with the optimum pressure drop $P_o$ to obtain outputs for energizing the solenoid valves 7 and 8. Thus, an appropriate suction pressure is established in the branch passage 6c. The pressure in the branch passage 6c is introduced into the suction pressure chamber 5d in the control valve 5 to thereby maintain the valve member 5a at an appropriate position. Thus, an optimum amount of recirculation gas is passed through the valve 5.

The pressure in the branch passage 6c is also introduced through the passage 17 into the suction pressure chamber 16d in the restriction valve 16 so as to maintain the valve member 16a at an appropriate position. It should be noted that the valve member 16a is moved synchronous with the valve member 5a so that the opening of the valve 16 changes substantially proportionally to that of the valve 5. Thus, when the valve member 5a is moved to open the valve 5 widely so that a large quantity of gas is allowed to pass therethrough, the valve member 16a is also moved to open the restriction 12 widely. Therefore, it is possible to ensure a sufficient recirculation of gas. When the opening of the valve 5 is small, the valve member 16a functions to decrease the effective area of the restriction 12 so that the pressure drop across the restriction 12 is increased. Therefore, it is possible to increase the accuracy of detection of the pressures by the pressure sensers 13 and 14 to thereby accomplish an accurate control of the gas recirculation.

Referring now to FIG. 2 showing a cycle of control by the control device 9, after the start $S_0$ of the control cycle, the engine speed signal N is received and stored in a predetermined address in the first step $S_1$. In the second step $S_2$, the intake suction pressure signal V is received from the senser 11 and stored in a predetermined address. Then, in the third step $S_3$, the optimum value $P_o$ of the pressure drop is obtained from the map $M_1$ of the memory 15 under the engine speed N and the intake suction pressure V, and the value $P_o$ is memorized in a predetermined address.

In the fourth and fifth steps $S_4$ and $S_5$, the first and second pressure signals $P_1$ and $P_2$ are respectively received from the sensers 13 and 14 and an operation is carried out to obtain an actual pressure drop $P_o' = P_1 - P_2$. In the sixth step $S_6$, the actual pressure drop $P_o'$ is compared with the optimum pressure drop $P_o$. If the values $P_o$ and $P_o'$ are substantially equal, another cycle is repeated from the step $S_1$.

If the values $P_o$ and $P_o'$ are not substantially equal, judgement is made on whether the value $P_o'$ is larger than the value $P_o$ in the seventh step $S_7$. If the value $P_o'$ is larger than the value $P_o$, a signal is produced in the eighth step $S_8$ to energize the solenoid valve 8 for a predetermined time to thereby decrease the pressure in the branch passage 6c. If the value $P_o'$ is smaller than the value $P_o$, a signal is produced in the nineth step $S_9$ to energize the solenoid valve 7 for a predetermined time so that the pressure in the branch passage 6c is increased. The control cycle is repeated to control the valves 5 and 16 to thereby obtain a suitable amount of exhaust gas recirculation.

In the above embodiment, the engine operating conditions are detected in terms of the engine speed and the intake pressure, however, it may as well be detected as a combination of the engine speed and the throttle valve position, a combination of the intake pressure and the throttle valve position, or the intake air flow which may be detected by an air flowmeter. The solenoid valves 7 and 8 may be substituted by duty ratio control valves of known type. The valves 5 and 16 may not necessarily be of a diaphragm type as disclosed but may be of type which are actuated by power actuators such as pulse motors or of conventional solenoid types.

Figure 4:
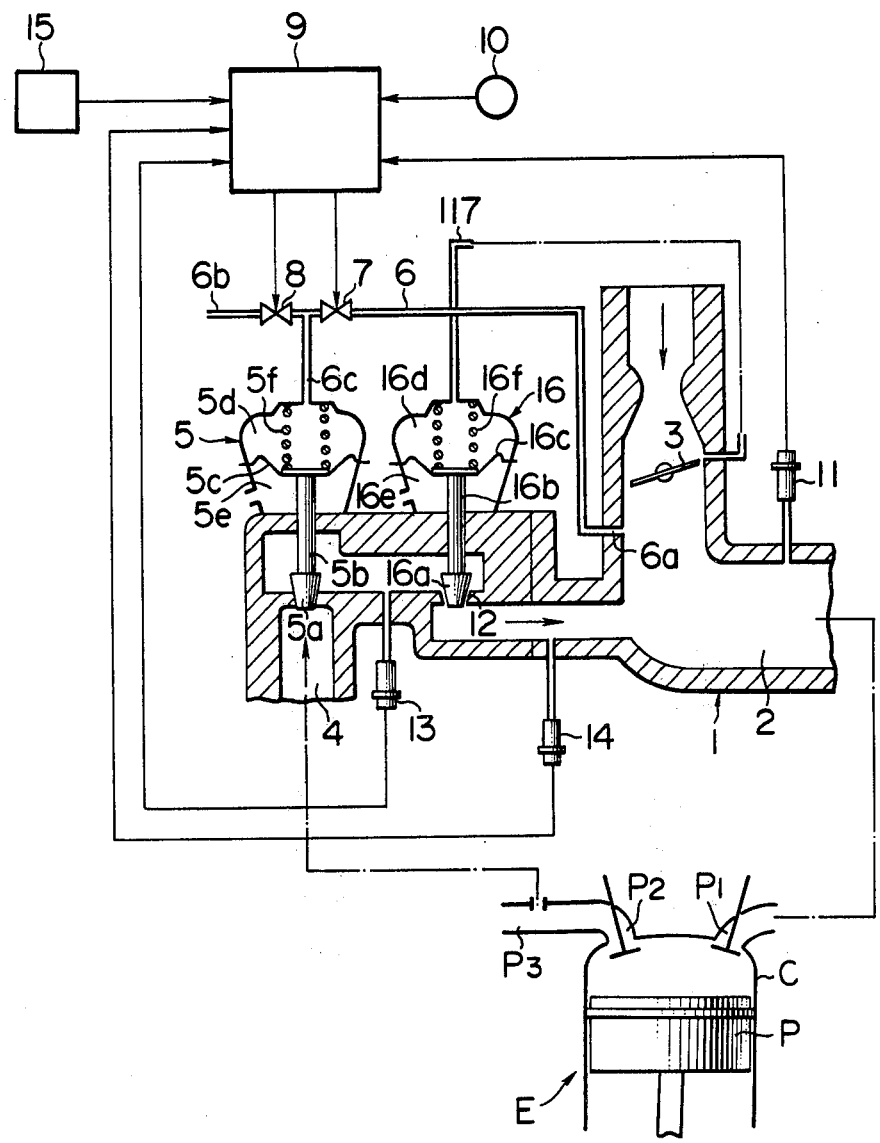
FIG. 4 is a view similar to FIG. 1 but showing another embodiment.

FIG. 4 shows another embodiment of the present invention in which the suction pressure chamber 16d of the restriction valve 16 is connected through a passage 117 to a pressure port 117a opening to the intake passage 2 adjacent to the throttle valve 3. The port 117a is located so that it is in the upstream side of the throttle valve 3 when the throttle valve opening is smaller than a predetermined value but in the downstream side when the throttle valve opening is larger than the predetermined value. When the throttle valve opening is small, the valve member 16a is therefore maintained at the closed position so that the effective area of the restriction 12 is decreased, however, when the throttle valve opening is increased beyond the predetermined value, the valve member 16a is moved to open the restriction widely. In this embodiment and also in the previous embodiment, the restriction 12 may be provided upstream of the control valve 5.

The invention has thus been shown and described with reference to specific embodiments, however, it should be noted that the invention is in no way limited to the details of the illustrated structures but changes and modifications may be made without departing from the scope of the appended claims.

I claim:

1. An internal combustion engine comprising combustion chamber means, intake passage means leading to said combustion chamber means for providing a supply of intake gas, exhaust passage means leading from said combustion chamber means for exhausting combustion gas therefrom, an exhaust gas recirculation system including exhaust gas recirculation passage means leading from said exhaust passage means to said intake passage means, recirculating gas control valve means provided in said recirculation passage means for controlling recirculated gas flow through said recirculation passage means, means for detecting engine operating conditions and providing an engine operating condition signal, restriction means provided in said recirculation passage means, pressure drop sensing means for detecting a pressure drop across the restriction means, memory means having memories of optimum values of pressure drop under various engine operating conditions, control means for adjusting said control valve means so that the pressure drop detected by the sensing means conforms to the memorized optimum value under a specific engine operating condition, said restriction means comprising restriction valve means of which opening can be varied, means for controlling said restriction valve means so that the opening is increased as the recirculated gas flow is increased.

2. An engine in accordance with claim 1 in which said engine operating condition detecting means is means for detecting engine speed and engine load.

3. An engine in accordance with claim 1 in which said engine operating condition detecting means is means for detecting engine speed and engine intake pressure.

4. An engine in accordance with claim 1 in which said control valve means is of a pneumatically operated diaphragm type, said restriction valve means is also of a pneumatically operated diaphragm type, common means being provided for producing a pressure to be applied to both of the control and restriction valve means so that they are synchronously actuated.

5. An engine in accordance with claim 4 in which said common means includes pressure passage means having one end leading to the intake passage means and the other end opened to the atmosphere, first and second solenoid valve means provided in said pressure passage means, branch passage means communicating with said pressure passage means between said first and second solenoid valve means and leading to said control and restriction valve means.

6. An engine in accordance with claim 1 in which said restriction valve means is of a pneumatically operated diaphragm type, pressure passage means being provided to apply an actuating pressure to said restriction valve means, said pressure passage means being opened to the intake passage means at such a position that the actuating pressure is changed when engine throttle valve means is opened beyond a predetermined value.

* * * * *